Patented Aug. 1, 1950

2,516,893

UNITED STATES PATENT OFFICE 2,516,893

REFRACTORY CONCRETE

Frank E. Lobaugh, South Plainfield, N. J., assignor to Universal Atlas Cement Company, a corporation of Indiana No Drawing. Application September 17, 1946, Serial No. 697,575

2 Claims. (Cl. 106—64)

This invention relates to an improved refractory, more particularly a refractory concrete of which an essential component is calcium silicate cement.

Among the objects of the invention is the provision of an improved refractory composition yielding articles such as refractory shapes of of refractory shapes resulting from such composition.

A further object of the invention is the provision of an improved refractory composition for use in the forming of veneer or wash coatings of improved strength and refractory properties, and of refractory shapes provided with such coatings.

Refractory materials or concretes composed of calcium silicate cement and various refractory aggregates have previously been employed in applications where they are subjected to high temperatures. Calcium silicate cement when mixed with water forms certain hydrated compounds which, when heated to elevated temperatures, lose appreciable portions of the combined water which results in reduced hydraulic strength. This loss of combined water increases with increase in temperature until at some temperature above 1600° F. all combined water is driven off and no hydraulic strength is present. When calcium silicate cement is used as a binder for refractory aggregates the resulting concrete likewise loses its hydraulic strength upon heating to some temperature above 1600° F. At temperatures in the vicinity of 1600° F., however, the concrete develops an appreciable ceramic strength by reason of the melting of some of the low melting compounds in the cement which combine with the aggregate to form a ceramic bond. Such ceramic strength increases with the increase in temperature until the softening point of the concrete mixture is reached.

The improved refractory composition of the present invention includes as an admixture an element or elements which are at least substantially insoluble in water and cement mixes, and thus do not affect the hydraulic strength of the concrete, but which have a relatively low melting point, that is, 1600° F. or below, so that, by melting at such temperatures, they provide the refractory concrete with a ceramic bond of increased strength. Such admixture must have a solubility in water and in cement mixes not exceeding 0.1% by weight, thus not appreciably altering the time of hydraulic set of the concrete or its strength, but must melt at a low enough temperature to add materially to the strength of the ceramic bond at temperatures which substantially overlap the upper end of the temperature range at which hydraulic strength is present in the concrete. Specifically, the invention employs for such purpose a frit which is a smelted raw mixture of soluble and insoluble inorganic materials. Such smelting is carried out by melting the soluble materials in the presence of sufficient silica and at high enough temperature to form substantially insoluble silicates. The frits employed in the present invention must have sufficient silica present so that upon being melted they form substantially insoluble silicates, since otherwise they might affect the hydraulic set of the cement and thus defeat the purpose of the admixture. Frits, both glaze and porcelain enamel, which have a melting point of 1600° F. or less, and which have solubilities in water and in cement mixtures not exceeding 0.1% by weight of the frit, may be employed in the practice of the invention.

The present invention consists in the addition of such frit to calcium silicate cement in the formation of refractory material. Refractory material within the scope of the present invention consists of calcium silicate cement, the above defined frit, and refractory materials which may be in the form of aggregates. The refractory concrete of the present invention is made from a mix, the constituents of which lie within the following limits, given as per cent of the total weight of the mix:

| | Per cent |
|---|---|
| Calcium silicate cement | 5 to 60 |
| Refractory aggregate | 15 to 93.5 |
| Substantially insoluble frit melting at 1600° F. or less | 0.5 to 25 |

In certain instances it is preferred to use a somewhat higher low limit of the frit content. In such cases the constituents of the mix lie within the following limits, given as per cent of the total weight of the mix or batch:

| | Per cent |
|---|---|
| Calcium silicate cement | 5 to 60 |
| Refractory aggregate | 15 to 92.5 |
| Substantially insoluble frit melting at 1600° F. or less | 2.5 to 25 |

The calcium silicate cement employed is one in which the predominant compounds that furnish the hydraulic strength to the mixture are calcium silicates. Examples are Portland cements, Portland-blast furnace slag cements, Portland pozzuolan cements, true pozzuolanic cements, slag cements, and natural cements.

"Portland cement" may be defined as the product obtained by pulverizing clinker consisting essentially of hydraulic calcium silicates, to which no additions have been made subsequent to calcination other than water and/or untreated calcium sulfate. The following Portland cement having the following composition, by weight, is typical

| | Per cent |
|---|---|
| CaO | 63–65 |
| $SiO_2$ | 20–22 |
| $Al_2O_3$ | 5–7 |
| $Fe_2O_3$ | Up to 4.5 |
| MgO, alkalies and minor constituents | Balance |

The "Portland-blast furnace slag cement," as that term is used herein, is made by grinding together Portland cement clinker and granulated blast furnace slag.

The "Portland pozzuolan cements," as that term is used herein, are produced by grinding together Portland cement clinker and either a natural or artificial pozzuolana.

The "true pozzuolanic cements," as that term is used herein, are composed of lime and granulated slag such as volcanic cinders or blast furnace slag, mixed without heating. A typical cement of this type is made by mixing hydrated lime with slag from an iron blast furnace, said slag having been quenched suddenly in water to leave the slag in a glassy non-crystalline form. The resulting lime-slag mixture is ground to a fine powder and is then ready for use.

The "slag cement," as that term is used herein, is a mixture of hydrated lime and granulated blast furnace slag. Certain additions may be added to accelerate the set.

The "natural hydraulic cements," as that term is used herein, are those made by calcining argillaceous limestones at temperatures only so high as to expel the combined $CO_2$ and $H_2O$. The calcareous portion of such argillaceous limestones may consist of $CaCO_3$ essentially, or of Ca and Mg carbonates combined in various proportions up to that represented by the mineral dolomite, $CaMg(CO_3)_2$.

As above stated the frit to be employed is either a glaze or porcelain enamel frit substantially insoluble in water and cement mixtures, and which has a melting point of 1600° F. or less. The following are three examples of typical frits which may be used, the compositions thereof being given in per cent by weight:

FRIT NO. 1

| | Per cent |
|---|---|
| $SiO_2$ | 22–56 |
| $Al_2O_3$ | 3–8 |
| $B_2O_3$ | 8–33 |
| $K_2O$ | 3–7 |
| $Na_2O$ | 3–14 |

Minor amounts, totaling approximately 20% at most, of $CaF_2$, $Na_2CO_3$, $NaNO_3$, CaO, $Fe_2O_3$, MgO, and so forth.

The above frit is suitable for use as a porcelain enamel ground coat.

FRIT NO. 2

| | Per cent |
|---|---|
| $SiO_2$ | 9–73 |
| $Al_2O_3$ | 2–10 |
| $B_2O_3$ | 5–28 |
| $K_2O$ | 2–9 |
| $Na_2O$ | 2–16 |

Minor amounts, totaling approximately 25% at most, of $Na_2CO_3$, $Na_3AlF_6$, $NaNO_3$, CaO, $Fe_2O_3$, MgO, and so forth.

Frit No. 2 is suitable for use as a porcelain enamel cover coat.

FRIT NO. 3

| | Per cent |
|---|---|
| $SiO_2$ | 31–62 |
| $B_2O_3$ | 12–25 |
| $Fe_2O_3$ | 1–8 |
| CaO | 5–20 |
| $Na_2O$ | 5–24 |

Minor amounts, totaling approximately 10% at most, of CaO, $Fe_2O_3$, MgO, and so forth.

Frit No. 3 was formed by smelting together a mixture of Rasorite, a borax compound, Calox, $Na_2O$, $CaCO_3$, and $SiO_2$ to yield a composition within the above range. Rasorite contains approximately 27.50% $Na_2O$, 61.50% $B_2O_3$, and 5.50% $SiO_2$ with lesser amounts of $Al_2O_3$, $Fe_2O_3$, CaO, and MgO. Calox consists of calcined limonite ($2Fe_2O_3 \cdot 3H_2O$).

The constituents of the mix are supplied thereto in either united or granular form to allow them to be uniformly distributed throughout the mix and consequently the resulting concrete. Those constituents which form the bond are preferably finely ground to facilitate their reaction. The calcium silicate cement, for example, may be of such fineness that practically all particles will pass through a 100 mesh screen, and the frit may be of approximately the same particle size. The refractory aggregate or filler, which may be fire clay grog, crushed firebrick, expanded shale, diatomaceous earth, vermiculite, crushed red brick, and the like, or combinations of such aggregates, may be of any desired particle size or range of particle sizes consistent with substantial uniformity of distribution throughout the resulting concrete.

The mix may conveniently be made by mixing the calcium silicate cement and the frit in dry condition to a uniform color, the refractory aggregate being thoroughly wet down with water and then added to the calcium silicate cement and frit mixture. Sufficient water is added to the resulting mixture to render it workable, the amount added depending upon the manner in which the mixture is to be subsequently handled in the formation of the concrete shape or structure. Thus, if the concrete is to be cast into a mold or form, particularly if the shape is intricate, the mix should be of puddling consistency. For simple shapes, so cast, less water may be used, whereas if the mix is to be tamped or vibrated into place or molded under pressure, still less water may be used. It is obvious that sufficient water may be used in all cases to develop fully the hydraulic strength of the cement and that an excess of water should be avoided.

The above directions apply mainly to the formation of cast shapes or structures from the mix of the invention. When such mix is to be employed for the making of veneer coatings or wash coats to other more refractory shapes, such as bricks, tiles, and the like, or as coatings or patches on larger shapes or structures such as furnace walls, it is obvious that the procedure must be modified accordingly. Thus for the veneer coatings, which ordinarily will be of the thickness on the order of one inch, the aggregate will be required to be of a particle size smaller than that for most cast shapes. For the wash coatings all ingredients of the mix should be finely ground. Further, when used as a wash coating larger amounts of water are required than in the other applications above outlined.

After the castable mixtures above described have been shaped or molded, and in the case of the veneer or wash coating after the refractory shape or structure has been so coated, such shapes, consisting solely of or in part of the wet refractory mixture of the invention, are dried and then heated. Usually for shapes of large section, such as cast furnace walls, the practice follows approximately that employed in the drying and heating of newly constructed firebrick linings. The concrete may be dried for a period of several days, after which the furnace is heated at temperatures which gradually increase up to operating temperature. Smaller blocks and shapes composed solely of such refractory mixture, such as cast bricks, tiles, and slabs, and refractory shapes with veneer or wash coatings of such mixture, may be kept for a time on the order of at least seventy-two hours in a high-humidity - constant temperature atmosphere, dried at a low temperature on the order of 230° F., and then subjected to a high temperature approximating that at which the shape may be used, for example 1600° F.

Concrete resulting from mixes made in accordance with the present invention, after having been dried and heated as above, possesses increased strength at both atmospheric and elevated temperatures as compared to similar concretes made from mixes containing no frit. Such increased strength of the concrete of the present invention at room temperatures is shown by the results set out in the following tables, which give the compressive strengths of two-inch cubes made of mixtures containing the indicated percentages by weight of Portland cement, frit, and refractory aggregate. In the making of such two-inch test cubes the mix was made of a puddling consistency and cast into two-inch cube molds. After being cured for seven days in a moist cabinet, the cubes were dried at 230° F., fired for the indicated length of time at the indicated temperature, and were then allowed to cool. After cooling, each cube was subjected to a compressive strength test at room temperature by subjecting it to gradually increasing pressure until a point of failure of the cube was reached.

In Tables I and II below the mixes employed contained Portland cement, porcelain enamel frit, and, as the appregrate, Haydite an expanded shale aggregate, and crushed firebrick, respectively. Such refractory aggregates had the following screen analyses:

SCREEN ANALYSES

|  | Per Cent on Mesh No. | | | | | | |
|---|---|---|---|---|---|---|---|
|  | 4 | 8 | 14 | 28 | 48 | 100 | Thru 100 |
| Haydite | 15.2 | 10.8 | 21.2 | 18.2 | 12.0 | 7.8 | 14.8 |
| Crushed firebrick | 12.3 | 16.0 | 19.2 | 14.0 | 11.7 | 10.8 | 16.0 |

The porcelain enamel frit was one designated No. 1100. Its analysis falls generally under that of frit No. 2 above as seen by its composition, as follows:

NO. 1100 PORCELAIN ENAMEL FRIT

| | Per cent |
|---|---|
| $SiO_2$ | 51.0 |
| $Al_2O_3$ | 7.2 |
| $B_2O_3$ | 12.4 |
| CaO | 4.3 |
| $Na_2O$ | 15.6 |
| $K_2O$ | 3.4 |
| F | 6.1 |

The frits were ground to such fineness that not more than 2.6% remained on a 200 mesh sieve. The Portland cement was of such fineness that 11.0% remained on a 326 mesh sieve. Each of the values given for each test in the following Tables I to IV, inclusive, represents the average of tests on three similar two-inch cubes.

TABLE I

*Portland cement-Haydite concrete plus porcelain enamel frit*

| Per Cent Frit By Weight of Cement | Per Cent Frit in Total Batch, by wt. | Per Cent Cement in Total Batch, by wt. | Per Cent Haydite in Total Batch, by wt. | Compressive Strength lbs. per Sq. Inch 4 Days Firing at— | |
|---|---|---|---|---|---|
| | | | | 1400° F. | 1600° F. |
| 0 | 0 | 30.9 | 69.1 | 909 | 421 |
| 12½ | 3.7 | 29.8 | 66.5 | 1,197 | 718 |
| 25 | 7.2 | 28.8 | 64.0 | 1,582 | 706 |
| 50 | 13.4 | 26.7 | 59.9 | 1,430 | 798 |
| 75 | 18.9 | 25.1 | 56.0 | 1,177 | 2,005 |
| 100 | 23.6 | 23.6 | 52.8 | 1,230 | 5,171 |

TABLE II

*Portland cement-crushed firebrick concrete plus porcelain enamel frit*

| Per Cent Frit By Weight of Cement | Per Cent Frit in Total Batch, by wt. | Per Cent Cement in Total Batch, by wt. | Per Cent Crushed Firebrick in Total Batch, by wt. | Compressive Strength lbs. per Sq. Inch 4 Days Firing at— | |
|---|---|---|---|---|---|
| | | | | 1400° F. | 1600° F. |
| 0 | 0 | 20.7 | 79.3 | 1,231 | 585 |
| 12½ | 2.5 | 20.0 | 77.5 | 1,293 | 702 |
| 25 | 4.8 | 19.5 | 75.7 | 1,073 | 675 |
| 50 | 9.3 | 18.7 | 72.1 | 973 | 884 |
| 75 | 13.3 | 17.8 | 68.9 | 1,033 | 1,788 |
| 100 | 17.0 | 17.0 | 66.0 | 1,385 | 3,571 |

As seen from Table I the addition of porcelain enamel frit to Haydite-Portland cement mixtures in an amount as small as 3.7% by weight of the total mixture or batch results in marked improvement in the compressive strength of the concrete, both when fired for four days at 1400° F. and at 1600° F. Such improvement continues, in specimens fired at 1600° F., until with the addition of 23.6% porcelain enamel frit the compressive strength is over twelve times that of the Haydite-Portland cement mixture, fired at the same temperature, but containing no frit. In the case of specimens fired at 1400° F., the compressive strength increases, with increasing frit content of the mixture, until 7.2% frit is added, after which the strength decreases slightly. With the addition of as much as 23.6% frit, however, the compressive strength of the specimens fired at 1400° F. was still markedly greater than that of the Haydite-Portland cement mixture, fired at the same temperature, but containing no frit.

With a concrete containing crushed firebrick and Portland cement the more beneficial results in compressive strengths are obtained when the specimens are heated to at least approximately 1600° F. As is evident from Table II, in the tests there tabulated specimens increased in compressive strength as the porcelain enamel frit was raised from 2.5% by weight of the total batch to 17.0%, the strength of specimens fired at 1600° F. and containing 17.0% frit being over six times that of the specimens, similarly fired, containing only crushed firebrick and Portland cement.

Increased strengths are also obtained when glaze frits are employed as an admixture in the disclosed cement-aggregate mixes. In the tests on two-inch cubes set out in Tables III and IV below the mixes employed are the same as those in Tables I and II, respectively, except that in Tables III and IV the frit employed is a glaze frit having the following composition:

GLAZE FRIT

| | Per cent |
|---|---|
| Na$_2$O | 10.6 |
| CaO | 17.7 |
| Fe$_2$O$_3$ | 1.1 |
| B$_2$O$_3$ | 23.9 |
| SiO$_2$ | 46.7 |

It will be seen that such glaze frit falls within the composition range of frit No. 3 above.

TABLE III

*Portland cement-Haydite concrete plus glaze frit*

| Per Cent Frit By Weight of Cement | Per Cent Frit in Total Batch, by wt. | Per Cent Cement in Total Batch, by wt. | Per Cent Haydite in Total Batch, by wt. | Compressive Strength lbs. per Sq. Inch 4 Days Firing at— | |
|---|---|---|---|---|---|
| | | | | 1400° F. | 1600° F. |
| 0 | 0 | 30.9 | 69.1 | 909 | 421 |
| 12½ | 3.7 | 29.8 | 66.5 | 1,309 | 880 |
| 25 | 7.2 | 28.8 | 64.0 | 1,368 | 910 |
| 50 | 13.4 | 26.7 | 59.9 | 1,522 | 1,241 |
| 75 | 18.9 | 25.1 | 56.0 | 2,392 | 1,977 |
| 100 | 23.6 | 23.6 | 52.8 | 3,046 | 3,612 |

TABLE IV

*Portland cement-crushed firebrick concrete plus glaze frit*

| Per Cent Frit By Weight of Cement | Per Cent Frit in Total Batch, by wt. | Per Cent Cement in Total Batch, by wt. | Per Cent Crushed Firebrick in Total Batch, by wt. | Compressive Strength lbs. per Sq. Inch 4 Days Firing at— | |
|---|---|---|---|---|---|
| | | | | 1400° F. | 1600° F. |
| 0 | 0 | 20.7 | 79.3 | 1,231 | 585 |
| 12½ | 2.5 | 20.0 | 77.5 | 1,088 | 732 |
| 25 | 4.8 | 19.5 | 75.7 | 1,279 | 958 |
| 50 | 9.3 | 18.7 | 72.1 | 1,890 | 1,542 |
| 75 | 13.3 | 17.8 | 68.9 | 2,931 | 2,475 |
| 100 | 17.0 | 17.0 | 66.0 | 3,863 | 4,654 |

It will be observed from Tables III and IV that the compressive strengths of the cubes containing the smallest noted amount of frit, 3.7% by weight of the batch in Table III and 2.5% by weight of the batch in Table IV, are noticeably higher than those of the similar mixes without frit, and that in each table, in general, the compressive strength of the concrete increases markedly with increased frit contents, in all cases the compressive strengths of specimens with the greatest amount of added frit, as shown, being at least several times that of mixes, similarly fired, but without the frit.

Although it is not desired to limit the invention to a particular theory of operation, it is believed from the observed results that the increased compressive strength of cements of the present invention are due to the fact that the frit functions as a flux, reacting under the heat when the refractory concrete mixture is fired to aid in the formation of the ceramic bond, which by reason of such fluxing action is stronger and more uniform than that obtained in similar mixtures without the frit. The use of such frit melting at a relatively low temperature such as 1600° F. or below and substantially insoluble in water and cement mixes does not, as explained, affect the hydraulic strength of the concrete but causes the development of a strong ceramic bond at temperatures which substantially overlap the temperatures at which the concrete retains substantial hydraulic strength.

Whereas particular embodiments of the invention have been described above for purposes of illustration, it will be evident that numerous variations of details are possible within the teaching of the invention. The scope of the invention therefore is to be defined by the following claims.

I claim:

1. A mix adapted for making refractory concrete by the addition of water, said mix consisting of from 5 to 60% of a cement selected from the group consisting of Portland cement, Portland-blast-furnace-slag cement, pozzuolan cement, true pozzuolanic cement, slag cement and natural cement; from 15 to 93.5% of aggregate selected from the group consisting of fire-clay grog, crushed brick, expanded shale, diatomaceous earth and vermiculite; and from .5 to 25% of a frit having a solubility less than .1% by weight in water-cement mixtures and effective to form a vitreous bond when heated to a temperature of 1400° F., said frit being composed for the most part of from 9 to 73% silicon dioxide, from 7 to 38% of oxides of metals selected from the group consisting of aluminum and boron, and from 4 to 25% of oxides of metals selected from the group consisting of potassium and sodium.

2. A mix for making refractory concrete, said mix consisting of a cement selected from the group consisting of Portland cement, Portland-blast-furnace-slag cement, pozzuolan cement, true pozzuolanic cement, slag cement and natural cement; and from 12.5 to 100% by weight of cement of a frit having a solubility less than .1% by weight in water-cement mixtures and effective to form a vitreous bond when heated to a temperature of 1400° F., said frit being composed for the most part of from 9 to 73% silicon dioxide, from 7 to 38% of oxides of metals selected from the group consisting of aluminum and boron and from 4 to 25% of oxides of metals selected from the group consisting of potassium and sodium.

FRANK E. LOBAUGH.

REFERENCES CITED

The following references are of record in the file of this patent:

UNITED STATES PATENTS

| Number | Name | Date |
|---|---|---|
| 1,573,482 | Daltan | Feb. 16, 1926 |

Certificate of Correction

Patent No. 2,516,893

August 1, 1950

FRANK E. LOBAUGH

It is hereby certified that error appears in the printed specification of the above numbered patent requiring correction as follows:

Column 1, line 8, before the word "of" insert *improved strength at elevated temperatures, and;* and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*